(12) United States Patent
Kwon

(10) Patent No.: US 9,099,772 B2
(45) Date of Patent: Aug. 4, 2015

(54) ANTENNA APPARATUS FOR PORTABLE TERMINAL

(75) Inventor: Young-Mi Kwon, Bucheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 498 days.

(21) Appl. No.: 13/298,125

(22) Filed: Nov. 16, 2011

(65) Prior Publication Data

US 2012/0146863 A1    Jun. 14, 2012

(30) Foreign Application Priority Data

Dec. 8, 2010    (KR) .......................... 10-2010-0124717

(51) Int. Cl.
| | |
|---|---|
| H01Q 1/24 | (2006.01) |
| H01Q 1/44 | (2006.01) |
| H01Q 9/04 | (2006.01) |
| H04M 1/02 | (2006.01) |

(52) U.S. Cl.
CPC ................. *H01Q 1/243* (2013.01); *H01Q 1/44* (2013.01); *H01Q 9/0421* (2013.01); *H04M 1/0266* (2013.01); *H04M 2250/22* (2013.01)

(58) Field of Classification Search
USPC .................................. 343/702, 850; 455/575.7
See application file for complete search history.

(56) References Cited

U.S. PATENT DOCUMENTS

| | | | |
|---|---|---|---|
| 7,069,043 B2* | 6/2006 | Sawamura et al. | ......... 455/550.1 |
| 2002/0126236 A1* | 9/2002 | Hiratsuka et al. | ............... 349/58 |
| 2008/0150901 A1* | 6/2008 | Lowles et al. | ................. 345/173 |
| 2011/0148718 A1* | 6/2011 | Wang et al. | .................... 343/702 |

* cited by examiner

*Primary Examiner* — Dieu H Duong

(57) ABSTRACT

An antenna apparatus for a portable terminal includes a main board and a display device. The main board has a ground for grounding and a feed terminal for feeding. The display device electrically communicates with the main board by the medium of a Flexible Printed Circuit Board (FPCB) and has an ElectroStatic Charge (ESD) prevention ground. If the display device is mounted above the main board, the ESD prevention ground of the display device comes in electric contact with the feed terminal of the main board, for emission.

17 Claims, 4 Drawing Sheets

ANTENNA APPARATUS FOR PORTABLE TERMINAL

CROSS-REFERENCE TO RELATED APPLICATION AND CLAIM OF PRIORITY

The present application is related to and claims priority under 35 U.S.C. §119(a) to a Korean Patent Application filed in the Korean Intellectual Property Office on Dec. 8, 2010 and assigned Serial No. 10-2010-0124717, the contents of which are herein incorporated by reference.

TECHNICAL FIELD OF THE INVENTION

The present invention relates to an antenna apparatus for a portable terminal. More particularly, the present invention relates to an antenna apparatus realizing, as an antenna, a ground installed in a display device.

BACKGROUND OF THE INVENTION

Recently, due to the development of the electronic communication industry, portable terminals are becoming necessities to a modern society while becoming an important means for delivery of fast changing information. Accordingly, a designers are competitively developing terminals having more convenient functions to guarantee many users. For one example, recently, portable terminals are supporting various services of Bluetooth®, Digital Multimedia Broadcasting (DMB), Wireless Local Area Network (WLAN) and the like in addition to a voice call function. This results in an increase of a case where, to support these services, the portable terminals include a large number of antennas, each supporting a different frequency band.

But, these antennas are mounted in a restricted space with difficulties in circumstances where terminals are miniaturized more and more.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, one aspect of the present invention is to provide an antenna apparatus that enables a slimming of a portable terminal.

Another aspect of the present invention is to provide an antenna apparatus for a portable terminal that prevents an ElectroStatic Discharge (ESD).

A further aspect of the present invention is to provide an antenna apparatus realizing, as an antenna, an ESD prevention ground provided in a display device.

Yet another aspect of the present invention is to provide an antenna apparatus in which, if a display device is coupled to a top of a main board to communicate with the main board by a Flexible Printed Circuit Board (FPCB), a ground provided in the display device to prevent ESD comes in mechanical contact with a feed terminal of the main board, for emission.

The above aspects are achieved by providing an antenna apparatus for a portable terminal.

In accordance with an exemplary embodiment of the present invention, an antenna apparatus for a portable terminal is provided. The antenna apparatus includes a main board and a display device. The main board has a ground for grounding and a feed terminal for feeding. The display device electrically communicates with the main board by the medium of a Flexible Printed Circuit Board (FPCB) and has an ElectroStatic Charge (ESD) prevention ground. If the display device is mounted above the main board, the ESD prevention ground of the display device comes in electric contact with the feed terminal of the main board, for emission.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE INVENTION

Preferred embodiments of the present invention will be described herein below with reference to the accompanying drawings. In the following description, well-known functions or constructions are not described in detail since they would obscure the invention in unnecessary detail. And, terms described below, which are defined considering functions in the present invention, may be different depending on user and operator's intention or practice. Therefore, the terms should be defined on the basis of the disclosure throughout this specification.

Exemplary embodiments of the present invention provide an antenna apparatus for a portable terminal and, more particularly, provide an antenna apparatus realizing, as an antenna, an ESD prevention ground provided in a display device. Further, the exemplary embodiments of the present invention propose a structure easy for the ESD prevention ground provided in the display device to be fed from a main board.

Figure 1:
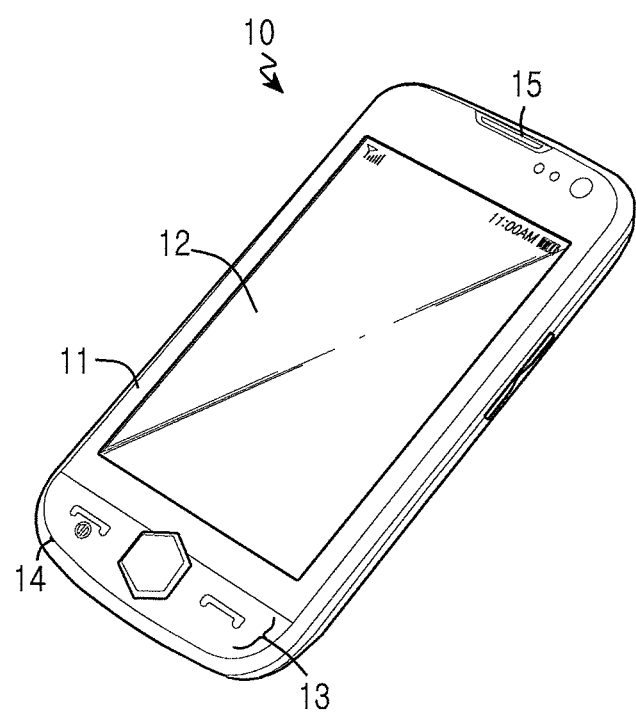
FIG. 1 illustrates a perspective diagram for a portable terminal according to an exemplary embodiment of the present invention.

FIG. 1 illustrates a perspective diagram for a portable terminal according to an exemplary embodiment of the present invention.

Referring to FIG. 1, the portable terminal 10 includes a body 11 forming an appearance, and a plurality of constituent elements provided in the body 11. The portable terminal 10 includes a display device 12 that outputs an image signal, a speaker device 15 that outputs a voice signal, a microphone device 14 that enables an input of a voice signal, and a key button 13 that is a data input means. The display device 12 can be a Liquid Crystal Display (LCD) having millions of pixels. If a touch screen is applied to the LCD, the display device 12 can perform a data input function accessorily or in place of the key button 13.

Alternatively, the portable terminal 10 includes a main antenna apparatus (not shown) that can transmit/receive a signal at a corresponding frequency band for a phone call, and a sub antenna apparatus for supplementary functions of Digital Multimedia Broadcasting (DMB), a Global Positioning System (GPS), Bluetooth®, Wireless Fidelity (WiFi) and the like. Each antenna apparatus has an antenna corresponding to a corresponding frequency band. Particularly, the antenna of the sub antenna apparatus uses an ESD prevention ground provided in the display device 12. A Printed Circuit Board (PCB) of the display device 12 constitutes the ESD prevention ground, and this ESD prevention ground is of a shape having a corresponding resonance frequency. The following description assumes that the portable terminal 10 performs the GPS supplementary function.

Further, the main antenna apparatus includes a Radio Frequency (RF) module unit for a phone call, and the sub antenna apparatus includes a module unit for a supplementary function. The supplementary function can be selectively used according to a user's terminal environment, so the sub antenna apparatus can be selectively used according to the user's terminal environment. For one example, if a user executes the GPS function, the ESD prevention ground provided in the display device 12 electrically connects with the supplementary function module unit.

Accordingly, the sub antenna apparatus can prevent the ESD of the portable terminal and simultaneously, process a signal at a frequency band corresponding to a corresponding supplementary function.

Figure 2:
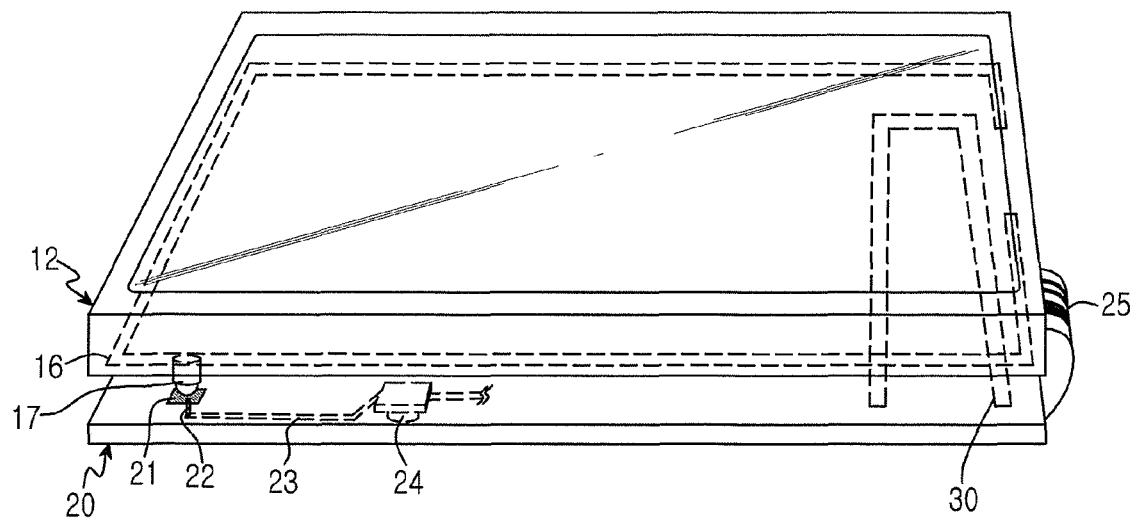
FIG. 2 illustrates a perspective diagram for an antenna apparatus for a portable terminal according to an exemplary embodiment of the present invention.

FIG. 2 illustrates a perspective diagram for an antenna apparatus for a portable terminal according to an exemplary embodiment of the present invention.

Referring to FIG. 2, the display device 12 is mounted above a main board 20, and electrically communicates with the main board 20 through an FPCB. That is, the display device 12 displays an image signal output from the main board 20. Further, if the display device 12 is a touch screen, the display device 12 can output an input signal to the main board 20. Although, as described later, an ESD prevention ground 16 provided in the display device 12 electrically connects with a ground (not shown) of the main board 20 and is fed from the main board 20, thus being capable of operating as a Planar Inverted F Antenna (PIFA) antenna for a supplementary function.

The display device 12 includes a PCB where a display unit such as an LCD and the like is realized, and the ESD prevention ground 16 realized in the PCB to prevent ESD. Further, if the display device 12 has a touch panel, the display device 12 can be a touch screen device. At this time, the ESD prevention ground 16 can be realized in a suitable place of the touch panel. For one example, the touch panel includes PolyCarbonate (PC) (i.e., a glass) playing a role of protection from the external, and an Indium Tin Oxide (ITO) layer attached to a bottom of the glass and sensing a touch. Also, the touch panel can further include a polarization film and a retardation film sequentially attached to a bottom of the ITO layer. The ITO layer can be of either resistive or capacitive. For example, the resistive ITO layer includes a top conductive layer and a bottom conductive layer spaced apart and faced. The resistive ITO layer senses a position coordinate according to a signal corresponding to a contact point at which the two conductive layers come in contact with each other by a press force. Further, the capacitive ITO layer has a high conductive glass. The capacitive ITO layer charges a surface of the conductive glass with electric charges (i.e., a flow of electric current) and senses a position where the electric charges vary upon contact, using a sensor. At this time, the ESD prevention ground 16 can be realized in the ITO layer.

The main board 20 is a substrate for mounting a basic circuit and parts. The main board 20 is a part of setting an execution environment of the portable terminal, keeping its information, allowing the portable terminal to be stably driven, and making smooth data input/output exchange of all devices of the portable terminal. The main board 20 includes a controller (i.e., a Central Processing Unit (CPU)), a microprocessor, an auxiliary processor, a memory, a Basic Input/Output System (BIOS), a connecting circuit and the like. The main board 20 has a main antenna 30 and an RF module unit (not shown) electrically connecting to the main antenna 30, and performs a call function. Also, the main board 20 further includes a supplementary function module unit (not shown) for supplementary functions of a GPS, Bluetooth® and the like. In future, the supplementary function module unit electrically connects with the ESD prevention ground 16 of the display device 12. That is, the ESD prevention ground 16 of the display device 12 operates as an antenna for a supplementary function.

As aforementioned, the display device 12 and the main board 20 electrically communicate with each other by the medium of an FPCB. Further, the exemplary embodiment of the present invention provides a structure easy for the ESD prevention ground 16 of the display device 12 to be fed from the main board 20. If the display device 12 is mounted above the main board 20, the ESD prevention ground 16 of the display device 12 electrically comes in contact with a feed terminal 21 of the main board 20. The ESD prevention ground 16 of the display device 12 and the feed terminal 21 of the main board 20 can electrically connect with each other by the medium of a certain contact means. Generally, the contact means can be a Pogo pin 17 widely known in the art, an elastic plate and the like. For one example, if the display device 12 is mounted above the main board 20, the Pogo pin 17 attached at one end to the ESD prevention ground 16 pressurizes the feed terminal 21 of the main board 20 and comes in electric contact with the feed terminal 21. The ESD prevention ground 16 can be realized on a bottom surface of the PCB and directly connect with the contact means (e.g., the Pogo pin 17), or can be realized on a top surface of the PCB and connect with the contact means (e.g., the Pogo pin 17) through a via formed in the PCB. Further, in a case of a touch screen, the ESD prevention ground 16 realized in the ITO layer can electrically connect with a contact means attached to the bottom surface of the PCB, through a via or a separate circuit. The feed terminal 21 can electrically connect with the supplementary function module unit through a via 22, a circuit 23, and an RF switch 24.

The main board 20 includes a ground (not shown) that cuts off harmful factors such as a noise and the like. The ESD prevention ground 16 of the display device 12 electrically connects with the ground of the main board 20 through the FPCB 25. Further, the ESD prevention ground 16 of the display device 12 is fed from the feed terminal 21 of the main board 20. As such, the ESD prevention ground 16 of the display device 12 can operate as a PIFA antenna. That is, the ESD prevention ground 16 of the display apparatus 12 can operate as an antenna as well as an inherent function. At this time, because of a characteristic of the PIFA antenna, the ESD prevention ground 16 of the display device 12 and the ground of the main board 20 are spaced a predetermined distance apart from each other. For one example, the display device 12 can be supported by a case frame forming an appearance of the portable terminal and be spaced apart from the ground of the main board 20.

The antenna apparatus using the ESD prevention ground 16 as the antenna can have a mismatching resonance frequency. At this time, a person having ordinary skill in the art may realize, in the main board 20, a matching circuit for controlling the resonance frequency. This does not intend to limit the scope of the invention and, to control the resonance frequency, the person having ordinary skill in the art can change a position where the ESD prevention ground 16 is fed from the main board 20.

Figure 3:
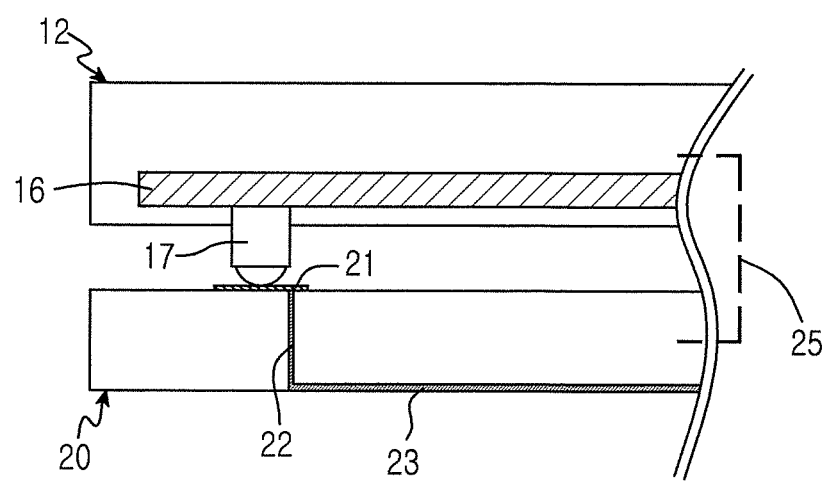
FIG. 3 illustrates a diagram for a structure of an antenna apparatus for a portable terminal according to an exemplary embodiment of the present invention.

FIG. 3 illustrates a diagram for a structure of an antenna apparatus for a portable terminal according to an exemplary embodiment of the present invention.

Referring to FIG. 3, if the display device 12 is mounted above the main board 20, the ESD prevention ground 16 of the display device 12 electrically connects with the feed terminal 21 of the main board 20 by the medium of the contact means 17. Further, the ESD prevention ground 16 electrically connects with the ground of the main board 20 by the medium of the FPCB 25. Accordingly, the ESD prevention ground 16 of the display device 12 can operate as a PIFA antenna as well as an inherent function.

Figure 4:
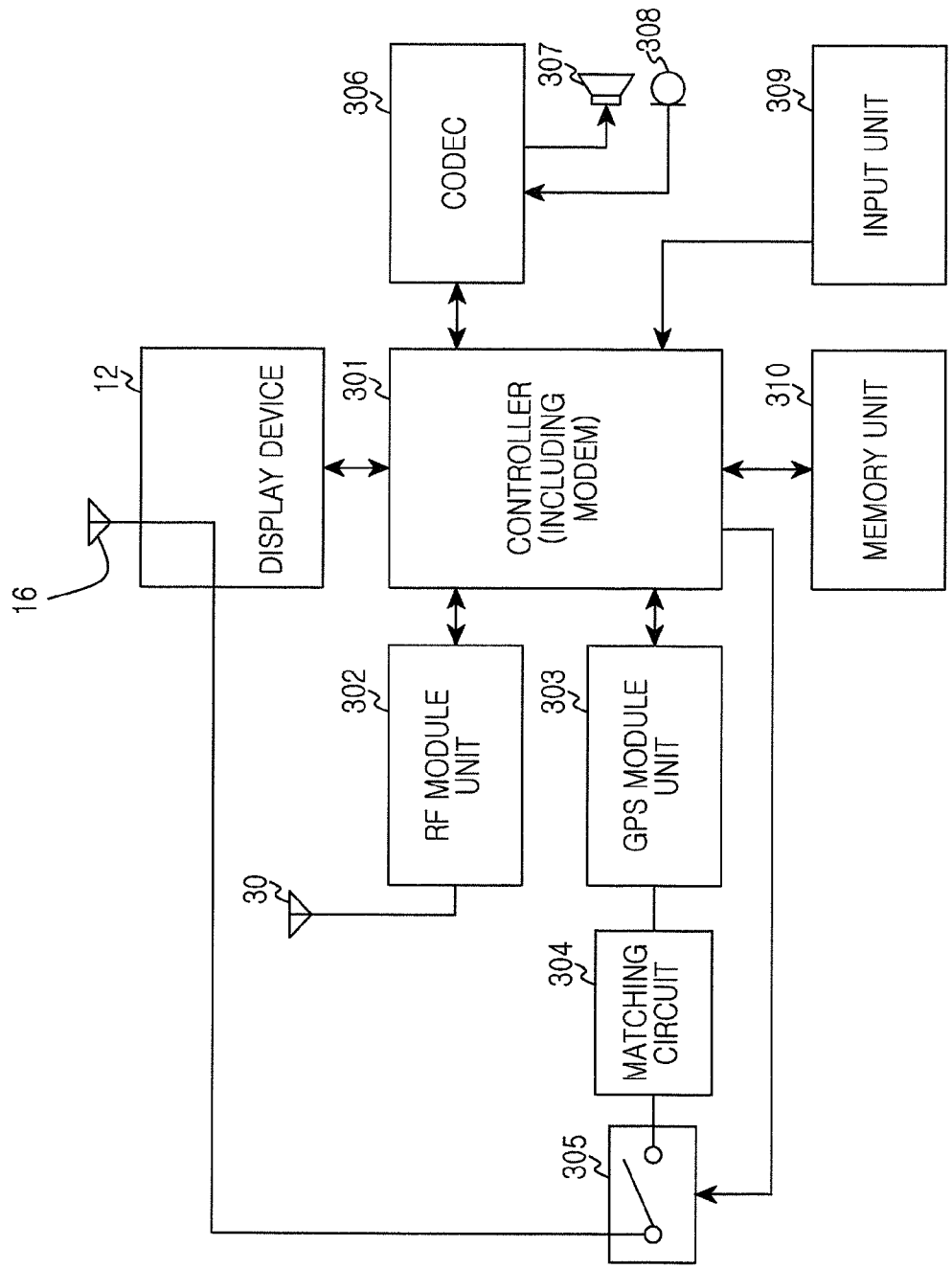
FIG. 4 illustrates a block diagram for a construction of a portable terminal according to an exemplary embodiment of the present invention.

FIG. 4 illustrates a block diagram for a construction of a portable terminal according to an exemplary embodiment of the present invention.

Referring to FIG. 4, a controller 301 includes a MOdulator/DEModulator (MODEM) for processing transmit/receive signals of an RF module unit 302 and a GPS module unit 303 described later. The module units 302 and 303 can be realized as one RF module such that individual processing for each antenna is possible.

A main antenna 30 electrically connects to the RF module unit 302 and transmits/receives a signal at a frequency band for a phone call.

A sub antenna according to an exemplary embodiment of the present invention (i.e., the ESD prevention ground 16 realized in the display device 12) is electrically switched to the GPS module unit 303 by means of a certain switching unit 305. The switching unit 305 is under the control of the controller 301. The switching unit 305 is constructed on a feeding line of the sub antenna 16.

The controller 301 can control the switching unit 305 according to a user's terminal use environment. For one example, if a portable terminal executes a GPS function, the controller 301 can control the switching unit 305 to connect the sub antenna 16 with the GPS module unit 303.

Desirably, the portable terminal can interpose a matching circuit 304 between the switching unit 305 and the GPS module unit 303 to improve the performance of the sub antenna 16. The matching circuit 304 can include elements such as an inductor, a capacitor and the like.

The display device 12, a COder/DECoder (CODEC) 306, a speaker 307, a microphone 308, an input unit 309, and a memory unit 310 are elements widely known in the art and thus, their descriptions are omitted.

As described above, an antenna apparatus for a portable terminal according to an exemplary embodiment of the present invention can prevent ESD by realizing an ESD prevention ground of a display device as an antenna. Further, the antenna apparatus has a structure in which, if the display device is coupled to a main board, the ESD prevention ground of the display device comes in contact with a feed terminal of the main board for emission, so its realization is easy. In future, a person having ordinary skill in the art can improve antenna performance by controlling a position where the ESD prevention ground of the display device comes in electric contact with the main board.

While the invention has been shown and described with reference to certain preferred embodiments thereof, it will be understood by those skilled in the art that various changes in form and details can be made therein without departing from the spirit and scope of the invention as defined by the appended claims.

What is claimed is:

1. An antenna apparatus for a portable terminal, the apparatus comprising:
   a main board including a ground configured to provide an electrical ground and a feed terminal configured to provide an electrical connection; and
   a display device configured to electrically communicate with the main board by the medium of a Flexible Printed Circuit Board (FPCB), the display device comprising an ElectroStatic Discharge (ESD) prevention ground, wherein the ESD prevention ground is disposed along an edge of the display device,
   wherein, if the display device is mounted above the main board, the ESD prevention ground of the display device is configured to electrically contact the feed terminal of the main board, for emission,
   wherein the display device comprises a display unit and a touch panel attached to the display unit, and
   wherein the ESD prevention ground is realized in one of the display unit and the touch panel.

2. The antenna apparatus of claim 1, wherein the FPCB is configured to electrically connect the ESD prevention ground of the display device and the ground of the main board.

3. The antenna apparatus of claim 1, wherein the ESD prevention ground of the display device and the feed terminal of the main board are configured to electrically contact with each other by the medium of one of: a Pogo pin and an elastic plate.

4. The antenna apparatus of claim 1, wherein the main board further comprises a matching circuit configured to connect to the feed terminal.

5. The antenna apparatus of claim 1, wherein the touch panel comprises:
   a protection layer comprising PolyCarbonate (PC); and
   an Indium Tin Oxide (ITO) layer attached to a bottom of the glass, the ITO layer configured to sense a touch.

6. The antenna apparatus of claim 1, wherein the ESD prevention ground has a resonance frequency of any one of Digital Multimedia Broadcasting (DMB), Global Positioning System (GPS), Bluetooth, and Wireless Fidelity (WiFi).

7. A portable terminal comprising:
   a housing;
   a main board disposed within the housing, the main board comprising a ground configured to provide an electrical ground and a feed terminal configured to provide an electrical connection; and
   a display device configured to electrically communicate with the main board by the medium of a Flexible Printed Circuit Board (FPCB), the display device comprising an ElectroStatic Discharge (ESD) prevention ground, wherein the ESD prevention ground is disposed along an edge of the display device, wherein, if the display device is mounted above the main board, the ESD prevention ground of the display device is configured to electrically contact the feed terminal of the main board, for emission, wherein the display device comprises a display unit and a touch panel attached to the display unit, and wherein the ESD prevention ground is realized in one of the display unit and the touch panel.

8. The portable terminal of claim 7, wherein the FPCB is configured to electrically connect the ESD prevention ground of the display device and the ground of the main board.

9. The portable terminal of claim 7, wherein the ESD prevention ground of the display device and the feed terminal of the main board are configured to electrically contact with each other by the medium of one of: a Pogo pin and an elastic plate.

10. The portable terminal of claim 7, wherein the main board further comprises a matching circuit configured to connect to the feed terminal.

11. The portable terminal of claim 7, wherein the touch panel comprises:
a protection layer comprising PolyCarbonate (PC); and
an Indium Tin Oxide (ITO) layer attached to a bottom of the glass, the ITO layer configured to sense a touch.

12. The portable terminal of claim 7, wherein the ESD prevention ground has a resonance frequency of any one of Digital Multimedia Broadcasting (DMB), Global Positioning System (GPS), Bluetooth, and Wireless Fidelity (WiFi).

13. A method comprising:
electrically communicating, by a display device, with a main board through a Flexible Printed Circuit Board (FPCB), the display device comprising an ElectroStatic Discharge (ESD) prevention ground; and in response to the display device being mounted above the main board, electrically contacting the ESD prevention ground of the display device to the feed terminal of the main board for emission, wherein the ESD prevention ground is disposed along an edge of the display device, wherein the display device comprises a display unit and a touch panel attached to the display unit, and wherein the ESD prevention ground is realized in one of the display unit and the touch panel.

14. The method of claim 13, further comprising electrically connecting, through the FPCB, the ESD prevention ground of the display device and the ground of the main board.

15. The method of claim 13, wherein electrically contacting the ESD prevention ground of the display device to the feed terminal comprises electrically contacting with the ESD prevention ground to the feed terminal by a medium of one of: a Pogo pin and an elastic plate.

16. The method of claim 13, wherein the main board further comprises a matching circuit configured to connect to the feed terminal.

17. The method of claim 13, wherein the ESD prevention ground has a resonance frequency of any one of Digital Multimedia Broadcasting (DMB), Global Positioning System (GPS), Bluetooth, and Wireless Fidelity (WiFi).

* * * * *